(12) United States Patent
Chu et al.

(10) Patent No.: US 9,511,969 B2
(45) Date of Patent: Dec. 6, 2016

(54) CLOSED-LOOP ALIGNMENT IDENTIFICATION WITH ADAPTIVE PROBING SIGNAL DESIGN TECHNIQUE FOR WEB MANUFACTURING OR PROCESSING SYSTEMS

(75) Inventors: Danlei Chu, North Vancouver (CA); Cristian Gheorghe, Port Moody (CA)

(73) Assignee: Honeywell Limited, Mississauga (CA)

( * ) Notice: Subject to any disclaimer, the term of this patent is extended or adjusted under 35 U.S.C. 154(b) by 968 days.

(21) Appl. No.: 13/433,101

(22) Filed: Mar. 28, 2012

(65) Prior Publication Data

US 2013/0262019 A1 Oct. 3, 2013

(51) Int. Cl.
*B65H 23/188* (2006.01)
*B65H 23/032* (2006.01)

(52) U.S. Cl.
CPC .......... *B65H 23/188* (2013.01); *B65H 23/032* (2013.01); *B65H 2557/61* (2013.01)

(58) Field of Classification Search
CPC G05B 13/042; B65H 23/032; B65H 23/188; B65H 2557/61; G09G 2310/0205; D21G 9/0009
See application file for complete search history.

(56) References Cited

U.S. PATENT DOCUMENTS

| | | | |
|---|---|---|---|
| 4,093,988 A * | 6/1978 | Scott | H04B 3/46 324/76.21 |
| 5,351,184 A | 9/1994 | Lu et al. | |
| 5,400,258 A | 3/1995 | He | |
| 5,539,634 A | 7/1996 | He | |
| 5,561,599 A | 10/1996 | Lu | |
| 5,572,420 A | 11/1996 | Lu | |
| 5,574,638 A | 11/1996 | Lu | |
| 5,853,543 A | 12/1998 | Hu et al. | |
| 5,892,679 A | 4/1999 | He | |
| 6,059,931 A | 5/2000 | Hu et al. | |
| 6,080,278 A | 6/2000 | Heaven et al. | |
| 6,086,237 A * | 7/2000 | Gorinevsky et al. | 700/127 |
| 6,092,003 A | 7/2000 | Hagart-Alexander et al. | |
| 6,149,770 A | 11/2000 | Hu et al. | |
| 6,233,495 B1 | 5/2001 | Chen | |
| 6,466,839 B1 | 10/2002 | Heaven et al. | |
| 6,564,117 B1 | 5/2003 | Chen et al. | |
| 6,650,947 B2 | 11/2003 | Fu et al. | |
| 6,805,899 B2 | 10/2004 | MacHattie et al. | |
| 6,807,510 B1 | 10/2004 | Backstrom et al. | |
| 7,128,808 B2 | 10/2006 | Metsala et al. | |
| 7,300,548 B2 | 11/2007 | Tran et al. | |
| 7,454,253 B2 | 11/2008 | Fan | |

(Continued)

OTHER PUBLICATIONS

Chu et al., Model Predictive Control and Optimization for Papermaking Processes, Advanced Model Predictive Control, Dr. Tao Zheng (Ed.), ISBN 978-953-307-298-2, 2011.*

(Continued)

*Primary Examiner* — Gregory J Toatley
*Assistant Examiner* — Kyle R Quigley (57) ABSTRACT

A method includes designing probing signals for testing an alignment of actuators in a web manufacturing or processing system with measurements of a web of material being manufactured or processed by the system. The method also includes providing the probing signals during alignment testing to identify the alignment of the actuators with the measurements of the web. Designing the probing signals includes designing the probing signals based on both spatial and dynamic characteristics of the web manufacturing or processing system.

20 Claims, 8 Drawing Sheets

(56) References Cited

U.S. PATENT DOCUMENTS

| | | |
|---|---|---|
| 7,459,060 B2 | 12/2008 | Stewart |
| 7,577,483 B2 | 8/2009 | Fan et al. |
| 7,648,614 B2 | 1/2010 | Tran et al. |
| 7,689,296 B2 | 3/2010 | Backstrom et al. |
| 2011/0290438 A1* | 12/2011 | Chu .................. D21G 9/0054 162/198 |

OTHER PUBLICATIONS

Gorinevsky et al., Identification Tool for Cross-Directional Processes, IEEE Transactions on Control Systems Technology, vol. 11, No. 5, Sep. 2003.*

Lipson et al., A Versatile Pseudo-Random Noise Generator, IEEE Transactions on Instrumentation and Measurement, vol. 25, No. 2, Jun. 1976.*

Danlei Chu, et al., "Online CD Performance Monitoring and Automatic Alignment Correction," Honeywell Process Solutions, 2011, pp. 945-970.

Danlei Chu, et al., "Intelligent Closed Loop CD Alignment," Honeywell Process Solutions, 6 pages.

Dimitry M. Gorinevsky, "Identification Tool for Cross-Directional Processes," IEEE Transactions on Control Systems Technology, vol. II, No. 5, Sep. 2003, pp. 629-640.

Soroush Karimzadeh, "Online Detection of Picketing and Estimation of Cross Direction and machine Direction Variations using the Discrete Cosine Transform," B.Sc., Sharif University of Technology, Dec. 2006, 94 pages.

E.D. Mauro, et al., "New Online Sensor for Paper Shrinkage Measurement," Proceedings of 1994 Control Systems conference, Stockholm Sweden 1994, pp. 145-151.

P.H. Viitaharju, et al., "Dried-in shrinkage profiles of paper webs," Tappi Journal, vol. 76, No. 8, 1993, pp. 129-134.

Torbjorn Wahlstrom, et al., "Dryer Section Simulator for Laboratory Investigations of Shrinkage Profile," International Paper Physics Conference, 2003, pp. 169-174.

Andrew R. Taylor, et al., "Detecting Mismapping in Cross-Directional Control Systems," IEEE Transactions on Control System Technology, Jul. 2009, pp. 1-7.

Tim Mast, et al., "New Optimization of CD Control for Global and Localized Profile Performance," TAPPI Spring Technical Conference & Trade Fair, 2003, 10 pages.

Calvin Fu, et al., "On-line Mapping Detection Without Compromising CD Quality," Control Systems/Pan-Pacific Conference, 2008, pp. 75-80.

Bryan R. Phillips, et al., "CD shrinkage profiles of paper—curve fitting and quantitative analysis," Appita Journal of Peer Reviewed, vol. 55, No. 3, May 2002, pp. 235-240.

S.J. I'anson, et al., "Enhancing Visibility of Wire-Mark by Image Analysis," Journal of Pulp and Paper Science, vol. 17, No. 1, Jan. 1991, pp. 22-26.

Stephen R. Duncan "Estimating the Response of Actuators in a Cross-Directional Control System," pp. 1-4.

* cited by examiner

CLOSED-LOOP ALIGNMENT IDENTIFICATION WITH ADAPTIVE PROBING SIGNAL DESIGN TECHNIQUE FOR WEB MANUFACTURING OR PROCESSING SYSTEMS

TECHNICAL FIELD

This disclosure relates generally to control systems. More specifically, this disclosure relates to closed-loop alignment identification with an adaptive probing signal design technique for web manufacturing or processing systems.

BACKGROUND

Sheets or other webs of material are used in a variety of industries and in a variety of ways. These materials can include paper, multi-layer paperboard, and other products manufactured in long webs and collected on reels. Web manufacturing or processing systems typically include multiple actuators positioned across a web being manufactured or processed. The direction across the web's width is called the cross direction, and the direction along the web's length is called the machine direction.

Cross direction (CD) alignment refers to the spatial relationship between centers of individual CD actuators' zones and centers of downstream CD web quality measurements. It is often an important parameter used to model a web manufacturing process, and it typically affects the performance of a feedback CD controller.

Conventional CD alignment identification techniques often rely on open-loop "bump" or "step" tests. During these tests, operation of a feedback CD controller is suspended, and multiple actuators are perturbed to new positions. Actuator setpoint profiles, web quality measurement profiles, or other data values are sent to a software tool, which runs an open-loop identification algorithm that returns a linear or nonlinear function quantifying the existing CD alignment.

Unfortunately, switching the feedback CD controller on and off interrupts the system's normal operation, and there is often no control over web qualities during open-loop tests. As a result, open-loop tests are often not preferred in practice. Also, many web manufacturing or processing system operators often depend on manual observation of misalignment symptoms in webs before starting an alignment identification test.

SUMMARY

This disclosure provides closed-loop alignment identification with an adaptive probing signal design technique for web manufacturing or processing systems.

In a first embodiment, a method includes designing probing signals for testing an alignment of actuators in a web manufacturing or processing system with measurements of a web of material being manufactured or processed by the system. The method also includes providing the probing signals during alignment testing to identify the alignment of the actuators with the measurements of the web. Designing the probing signals includes designing the probing signals based on both spatial and dynamic characteristics of the web manufacturing or processing system.

In a second embodiment, an apparatus includes at least one processing unit configured to design probing signals for testing an alignment of actuators in a web manufacturing or processing system with measurements of a web of material being manufactured or processed by the system. The apparatus also includes at least one interface configured to provide the probing signals during alignment testing to identify the alignment of the actuators with the measurements of the web. The at least one processing unit is configured to design the probing signals based on both spatial and dynamic characteristics of the web manufacturing or processing system.

In a third embodiment, a system includes an adaptive alignment unit configured to design probing signals for testing an alignment of actuators in a web manufacturing or processing system with measurements of a web of material being manufactured or processed by the web manufacturing or processing system. The system also includes a signal generator configured to provide the probing signals during alignment testing to identify the alignment of the actuators with the measurements of the web. The adaptive alignment unit is configured to design the probing signals based on both spatial and dynamic characteristics of the web manufacturing or processing system.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 8, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
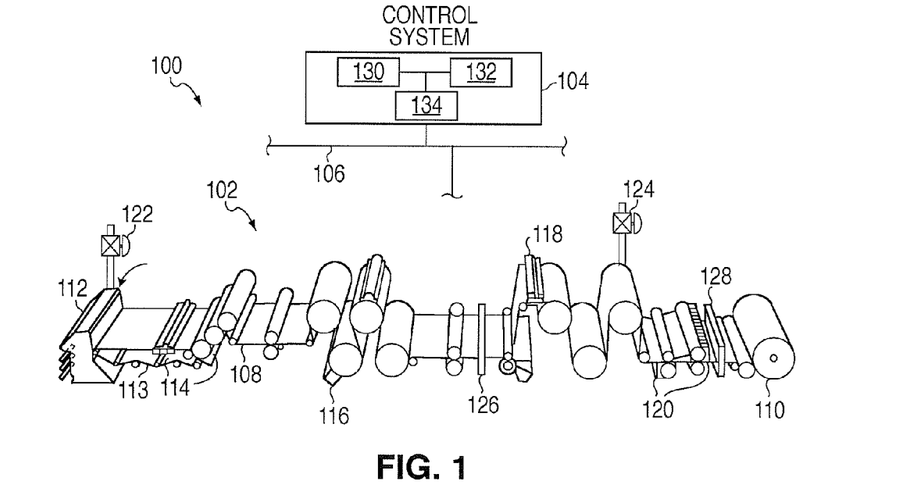
FIG. 1 illustrates an example web manufacturing or processing system according to this disclosure.

FIG. 1 illustrates an example web manufacturing or processing system 100 according to this disclosure. In this example, the system 100 includes a paper machine 102, a control system 104, and a network 106. The paper machine 102 includes various components used to produce a paper product, namely a paper web 108 that is collected at a reel 110. The control system 104 monitors and controls the operation of the paper machine 102, which may help to maintain or increase the quality of the paper web 108 produced by the paper machine 102.

In this example, the paper machine 102 includes at least one headbox 112, which distributes a pulp suspension uniformly across the machine onto a continuous moving wire screen or mesh 113. The pulp suspension entering the headbox 112 may contain, for example, 0.2-30% wood fibers, fillers, and/or other materials, with the remainder of the suspension being water. The headbox 112 may include an array of dilution actuators, which distributes dilution water into the pulp suspension across the web. The dilution water may be used to help ensure that the resulting paper web 108 has a more uniform basis weight across the web 108.

Arrays of drainage elements 114, such as vacuum boxes, remove as much water as possible to initiate the formation of the sheet 108. An array of steam actuators 116 produces hot steam that penetrates the paper web 108 and releases the latent heat of the steam into the paper web 108, thereby increasing the temperature of the paper web 108 in sections across the web. The increase in temperature may allow for easier removal of remaining water from the paper web 108. An array of rewet shower actuators 118 adds small droplets of water (which may be air atomized) onto the surface of the paper web 108. The array of rewet shower actuators 118 may be used to control the moisture profile of the paper web 108, reduce or prevent over-drying of the paper web 108, or correct any dry streaks in the paper web 108.

The paper web 108 is then often passed through a calender having several nips of counter-rotating rolls. Arrays of induction heating actuators 120 heat the shell surfaces of various ones of these rolls. As each roll surface locally heats up, the roll diameter is locally expanded and hence increases nip pressure, which in turn locally compresses the paper web 108. The arrays of induction heating actuators 120 may therefore be used to control the caliper (thickness) profile of the paper web 108. The nips of a calender may also be equipped with other actuator arrays, such as arrays of air showers or steam showers, which may be used to control the gloss profile or smoothness profile of the paper web.

Two additional actuators 122-124 are shown in FIG. 1. A thick stock flow actuator 122 controls the consistency of incoming stock received at the headbox 112. A steam flow actuator 124 controls the amount of heat transferred to the paper web 108 from drying cylinders. The actuators 122-124 could, for example, represent valves controlling the flow of stock and steam, respectively. These actuators may be used for controlling the dry weight and moisture of the paper web 108.

Additional components could be used to further process the paper web 108, such as a supercalender (for improving the paper web's thickness, smoothness, and gloss) or one or more coating stations (each applying a layer of coatant to a surface of the paper to improve the smoothness and printability of the paper web). Similarly, additional flow actuators may be used to control the proportions of different types of pulp and filler material in the thick stock and to control the amounts of various additives (such as retention aid or dyes) that are mixed into the stock.

This represents a brief description of one type of paper machine 102 that may be used to produce a paper product. Additional details regarding this type of paper machine 102 are well-known in the art and are not needed for an understanding of this disclosure. Also, this represents one specific type of paper machine 102 that may be used in the system 100. Other machines or devices could be used that include any other or additional components for producing a paper product. In addition, this disclosure is not limited to use with systems for producing paper products and could be used with systems that process a paper product or with systems that produce or process other items or materials (such as multi-layer paperboard, cardboard, plastic, textiles, metal foil or webs, or other or additional materials that are manufactured or processed as moving webs).

In order to control the paper-making process, one or more properties of the paper web 108 may be continuously or repeatedly measured. The web properties can be measured at one or various stages in the manufacturing process. This information may then be used to adjust the paper machine 102, such as by adjusting various actuators within the paper machine 102. This may help to compensate for any variations of the web properties from desired targets, which may help to ensure the quality of the web 108.

As shown in FIG. 1, the paper machine 102 includes one or more sensor arrays 126-128, each of which may include one or more sensors. Each sensor array 126-128 is capable of measuring one or more characteristics of the paper web 108. For example, each sensor array 126-128 could include sensors for measuring the moisture, basis weight, caliper, coat weight, anisotropy, color, gloss, sheen, haze, fiber orientation, surface features (such as roughness, topography, or orientation distributions of surface features), or any other or additional characteristics of the paper web 108.

Each sensor array 126-128 includes any suitable structure or structures for measuring or detecting one or more characteristics of the paper web 108. The sensors in a sensor array 126-128 could be stationary or scanning sensors. Stationary sensors could be deployed in one or a few locations across the web 108, or they could be deployed at multiple locations across the whole width of the web 108 such that substantially the entire web width is measured. A scanning set of sensors could include any number of moving sensors.

The control system 104 receives measurement data from the sensor arrays 126-128 and uses the data to control the paper machine 102. For example, the control system 104 may use the measurement data to adjust any of the actuators or other components of the paper machine 102. The control system 104 includes any suitable structure for controlling the operation of at least part of the paper machine 102, such as one or more computing devices. In this example, the control system 104 includes at least one processing device 130 and at least one memory 132 storing instructions and data used, generated, or collected by the processing device(s) 130. The control system 104 also includes at least one network interface 134 for communicating over one or more networks, such as an Ethernet network, an electrical signal network, or any other or additional type(s) of network(s). The control system 104 could include a single computing device with these components, or multiple distributed computing devices could include multiple instances of these components.

The network 106 is coupled to the control system 104 and various components of the paper machine 102 (such as the actuators and sensor arrays). The network 106 facilitates communication between components of the system 100. The network 106 represents any suitable network or combination of networks facilitating communication between components in the system 100. The network 106 could, for example, represent a wired or wireless Ethernet network, an electrical signal network (such as a HART or FOUNDATION FIELDBUS network), a pneumatic control signal network, or any other or additional network(s).

In the system 100 of FIG. 1, various actuator arrays represent CD actuator arrays, such as the dilution actuators, steam actuators, rewet shower actuators, and induction heating actuators. These actuator arrays control characteristics of the web 108 in the cross direction. As noted above, the alignment of CD actuators is often an important parameter in various functions. The CD alignment in the system 100 can change from time to time due to various reasons, such as machine speed changes, new grade loads, or web wander. However, it is often difficult to identify CD alignment during normal operation of the paper machine 102 using conventional alignment identification techniques. Moreover, alignment identification is conventionally performed only after visible symptoms of CD misalignment appear.

This disclosure provides a technique for designing probing signals used to perturb actuators during an identification experiment in which current CD actuator alignment is tested. The probing signals can be designed in response to detecting misalignment of the CD actuators, which could occur on a continuous, intermittent, or other basis in the system 100. Once the current alignment of CD actuators is identified, corrective action can be taken, such as adjusting control signals for the CD actuators to compensate for misalignment. The design and use of the probing signals can occur in a closed-loop manner, which means a feedback control technique in the control system 104 need not be disabled.

Although FIG. 1 illustrates one example of a web manufacturing or processing system 100, various changes may be made to FIG. 1. For example, other systems could be used to produce paper products or other products. Also, while shown as including a single paper machine 102 with various components and a single control system 104, the production system 100 could include any number of paper machines or other production machinery having any suitable structure, and the system 100 could include any number of control systems. In addition, FIG. 1 illustrates one operational environment in which the CD alignment functionality can be used. This functionality could be used in any other suitable system.

Figure 2:
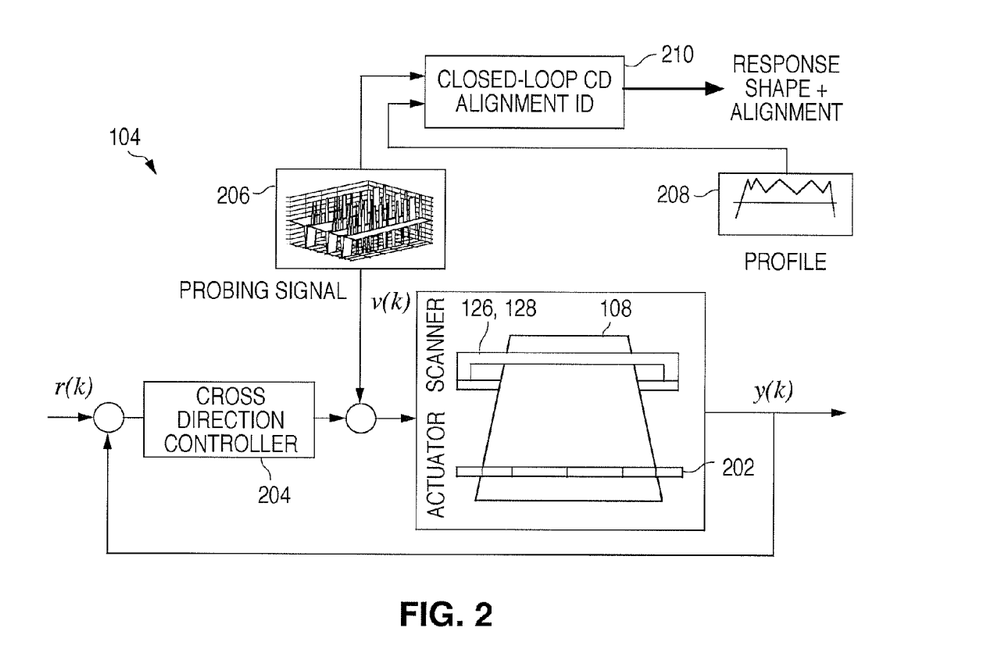
FIG. 2 illustrates an example control system for closed-loop alignment identification with an adaptive probing signal design technique according to this disclosure.

FIG. 2 illustrates an example control system 104 for closed-loop alignment identification with an adaptive probing signal design technique according to this disclosure. As shown in FIG. 2, the alignment identification functionality is used in conjunction with at least one CD actuator array 202, which could represent any of the CD actuator arrays discussed above and may be referred to as an actuator "beam." In this example, CD alignment refers to the spatial relationship between the centers of individual CD actuators' zones in the array 202 and the centers of downstream CD web quality measurements taken by the scanner(s) 126-128.

In this example, the control system 104 includes a CD controller 204, which adjusts the actuators in the array 202 based on feedback. The feedback could represent any suitable data, such as measurements from the scanner(s) 126-128. The CD controller 204 could modify the setpoints of the array 202 in any suitable manner depending on, for example, the type of actuators in the array 202 and the control logic implemented within the CD controller 204. The CD controller 204 includes any suitable structure for controlling CD actuators.

The control system 104 also includes components for performing functions related to CD actuator alignment. For example, a test signal generator 206 generates probing signals for exciting the actuators in the array 202 during alignment testing. The probing signals could represent Pseudo-Random Binary Sequence (PRBS) signals or other suitable signals. The probing signals are combined with the signals output by the controller 204, and the combined signals are provided to the actuators in the array 202. The test signal generator 206 includes any suitable structure for generating signals for testing the alignment of CD actuators.

Characteristics of the web 108 are measured by the scanner(s) 126-128, resulting in one or more profiles 208. The profiles 208 can be captured before, during, and after alignment testing of the actuators in the array 202. The profiles 208 identify the values of at least one characteristic across the web 108.

The profiles 208 are provided to an adaptive alignment unit 210. The adaptive alignment unit 210 uses the profiles 208 to perform various functions related to the alignment of the CD actuators in the array 202. For example, the adaptive alignment unit 210 can use the profiles 208 to detect alignment problems before the problems result in visible changes to the web 108. The adaptive alignment unit 210 can also use the profiles during testing to identify the current alignment of the actuators. Further, the adaptive alignment unit 210 can use the profiles 208 to verify alignment corrections after alignment testing is completed. In addition, the adaptive alignment unit 210 can identify the signals to be used during alignment testing, and the adaptive alignment unit 210 can provide information defining those signals to the test signal generator 206. The adaptive alignment unit 210 includes any suitable structure for identifying CD actuator alignment. The adaptive alignment unit 210 could, for example, include at least one computing device having one or more processing units, one or more memories, and one or more network interfaces.

In some embodiments, the adaptive alignment unit 210 implements an adaptive alignment technique that includes four different alignment-related functions. The functions include CD alignment monitoring, probing signal design, closed-loop identification, and alignment deployment. CD alignment monitoring involves monitoring the system 100 to identify if and when an alignment problem occurs, such as by using the profiles 208. Probing signal design involves designing the PRBS or other signals used by the test signal generator 206 during alignment testing. Closed-loop identification involves identifying the current alignment of the CD actuators in the array 202. Alignment deployment involves adjusting one or more models used by the controller 204 to take into account the current alignment of the CD actuators, thereby allowing the controller 204 to help compensate for alignment problems.

Adaptive alignment provides a proactive and intelligent solution to CD alignment identification. In some embodiments, closed-loop alignment identification can be automatically triggered based on one or more CD performance indexes, and the indexes can be automatically defined by performance baselining operations. Also, performance monitoring can be run in the background of a CD control platform. In addition, a closed-loop test can be performed whenever a misalignment is detected, a closed-loop model identification algorithm can be executed, and a model can be evaluated using process data. The identified alignment may be deployed to a real process if and only if CD control performance would improve after deployment. The entire adaptive alignment identification procedure can be fully automated with no user intervention.

Compared to conventional open-loop alignment identification approaches, this adaptive alignment technique can have various advantages depending on the implementation. For example, it may not require the controller 204 to be deactivated during alignment identification testing. Also, it can use PRBS signals as probing signals during the identification test, and the characteristics of the probing signals (such as magnitude, duration, and location) can be automatically determined by the probing signal generation algorithm. Standard open-loop identification approaches often employ persistent step perturbations, where the duration and location of the perturbed actuator zones are determined by a user. Closed-loop PRBS tests may induce much less CD variation to web quality measurements (such as when the same magnitude and the same length of perturbations are used). In addition, testing can be triggered automatically by performance monitoring algorithms, and there may be no requirement for user intervention.

Since the identification testing used during adaptive alignment is an active closed-loop system identification algorithm, adaptive probing signal design can be used to optimize the amount of energy injected into the system during alignment identification. For example, it can reduce or minimize the impact of the identification process on CD performances while allowing adequate excitation to be injected for successful alignment identification. The magnitude and duration of perturbations in the probing signal determine the amount of energy to be injected into the system. Larger and longer probing signals typically help the identification algorithm, but they can induce more variation in CD measurement profiles (degrading CD control performance).

Among other things, the design of the probing signals can dynamically take into account and respect the actuators' physical constraints. These constraints may include the maximum and minimum actuator setpoint values, allowable maximum actuator moves, and bending limits for slice lip or induction heating actuators. The distribution of PRBS probing signals across the actuator beam can also be useful during nonlinear shrinkage profile identification so that the resulting PRBS signals have enough coverage in areas with high nonlinear shrinkage ratios across the web 108.

In some embodiments, the adaptive probing signal design includes grouping CD actuators into different clusters, and adaptive probing signal modes are automatically generated to handle processes with severe actuator constraints or low gains. Process dynamics are also incorporated in the adaptive probing signal design. Among other things, the adaptive probing signal design can automatically generate probing signals in a manner that is adaptive to a process' physical limits and to input-to-output dynamics. Moreover, the adaptive probing signal design can handle various problems, such as:

how to generate the probing signals if a CD actuator beam is severely constrained, since there is typically very limited room for deploying exogenous perturbations with a CD process having a severely constrained actuator beam;

how to use an adaptive filter to design the probing signals for a process that has a relatively long time constant (for very slow process) but a relatively short time delay; and how to coordinate the probing signals of different actuator zones so that CD identification experiments have little or no impact on the averages of CD quality measurements (limiting machine directional upsets).

Additional details regarding probing signal design are provided below.

Although FIG. 2 illustrates one example of a control system 104 for closed-loop alignment identification with an adaptive probing signal design technique, various changes may be made to FIG. 2. For example, the functional division shown in FIG. 2 is for illustration only. Various components of the control system 104 could be combined or further subdivided, such as by combining two or more of the components 204-206, 210 into a single functional unit. As a particular example, the probing signals used during an identification experiment could be generated by the adaptive alignment unit 210 itself.

Figure 3:
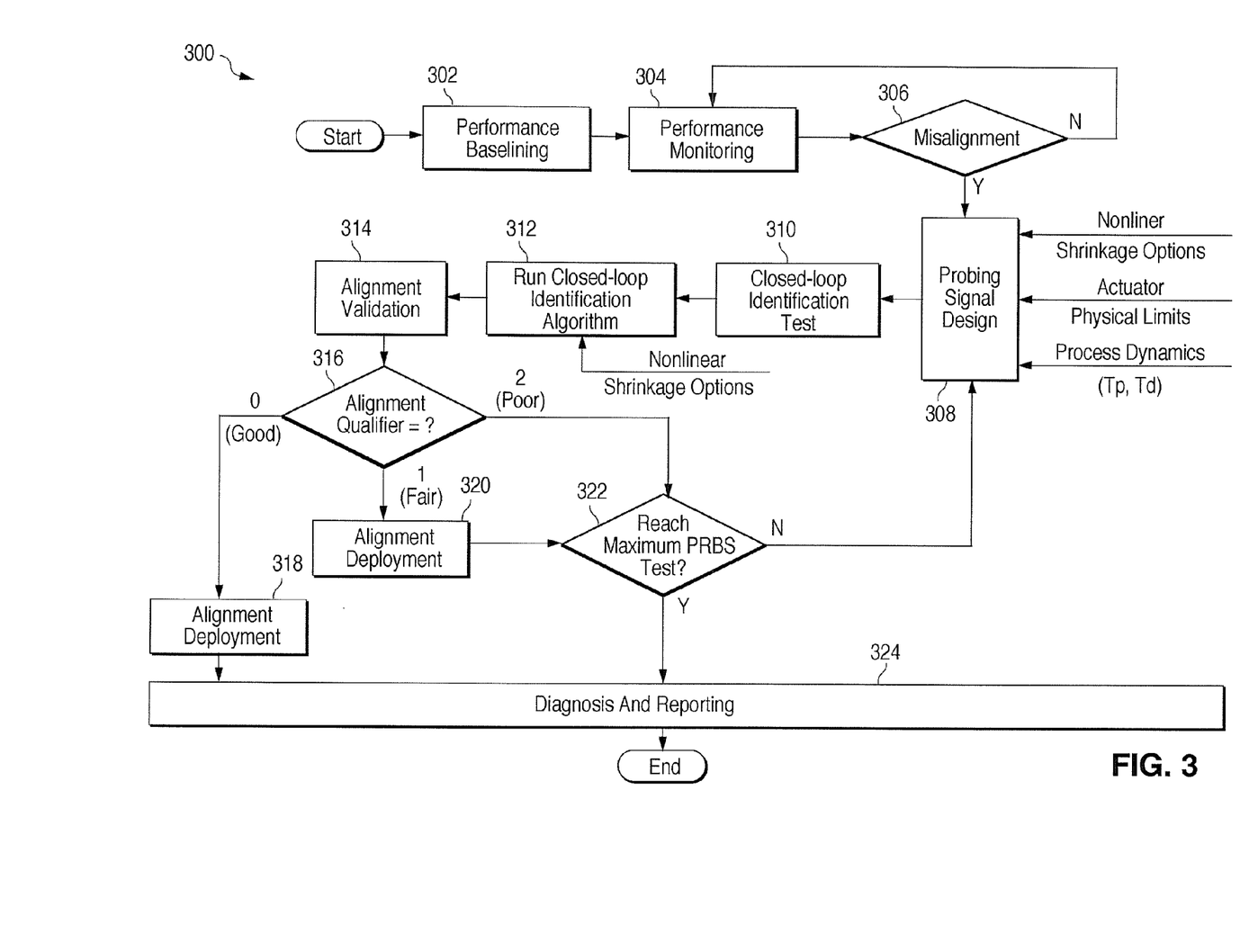
FIGS. 3 through 8 illustrate example methods for closed-loop alignment identification with adaptive probing signal design according to this disclosure.

FIGS. 3 through 8 illustrate example methods for closed-loop alignment identification with adaptive probing signal design according to this disclosure. FIG. 3 illustrates an example of an overall method 300 for performing adaptive alignment. As shown in FIG. 3, the adaptive alignment process begins with performance baselining at step 302. This could include, for example, the adaptive alignment unit 210 identifying one or more profiles 208 associated with normal behavior of the system 100. As a particular example, this could include the adaptive alignment unit 210 capturing one or more profiles 208 taken during times when the actuators in the array 202 are misaligned artificially with a safe amount of misalignment. This can provide a basis for future mathematical measurements of misalignment.

Performance monitoring occurs at step 304, and a determination is made whether misalignment has been detected at step 306. This could include, for example, the adaptive alignment unit 210 comparing more recent profiles 208 with the baseline and determining whether a threshold amount of misalignment is detected. If not, the process returns to step 304 for further monitoring. In particular embodiments, a CUSUM algorithm can be used to perform the monitoring and misalignment detection steps. One example CUSUM algorithm that could be used is described in U.S. Patent Publication No. 2011/0290438, which is hereby incorporated by reference in its entirety.

If misalignment is detected, probing signal design occurs at step 308. This could include, for example, designing PRBS probing signals while taking into account nonlinear shrinkage options, actuator physical limits, and process dynamics. Additional details regarding probing signal design are provided below. A closed-loop identification test occurs at step 310. This could include, for example, the test signal generator 206 generating the probing signals designed during the prior step, which perturbs the actuators in the array 202. One or more profiles 208 are captured during the identification test.

A closed-loop identification algorithm is executed at step 312. This could include, for example, the adaptive alignment unit 210 using the profiles 208 captured during the identification test to identify the current alignment of the actuators in the array 202. As a particular example, the identification algorithm can extract open-loop CD spatial shape responses from the closed-loop experiment data. This algorithm can be extended to identify a full CD model, including response gain, width, attenuation, and divergence. Three different types of shrinkage profiles (linear shrinkage, parametric nonlinear shrinkage, and nonparametric nonlinear shrinkage) could be supported by the algorithm. A suitable probing signal design approach can incorporate a nonlinear shrinkage profile, actuator physical limits, and process dynamics (time delay $T_d$ and time constant $T_p$) into the probing signal generation. Provided below are details describing the use of PRBS probing signals in both the spatial domain (CD direction) and the dynamic domain (machine direction). In particular embodiments, step 310 could be performed over multiple iterations (such as 30 to 40 scans) to gather data, and the data could then be used during execution of step 312.

Alignment validation occurs at step 314. This could include, for example, the adaptive alignment unit 210 taking the identified alignment and determining whether use of the identified alignment improves operation of the controller 204. A determination can be made here whether the alignment validation results in a good, fair, or poor qualifier at step 316. If the validation provides a good or fair result, the identified alignment is deployed at step 318 or 320. This could include, for example, using the identified alignment in the controller 204 to control the operation of the CD actuators. After step 320 or if the validation provides a poor result, a determination is made whether a maximum number of probing signal tests have been performed at step 322. If not, the process returns to step 308 to redesign the probing signals.

Diagnosing and reporting occur at step 324. This could include, for example, a diagnosing and reporting subsystem of the control system 104 providing information about the usage of the adaptive alignment algorithm. General information can include event logs for misalignment detection, closed-loop identification, and online deployment. Also, in the case of algorithm failures, the subsystem can provide theoretical analysis for failures, and a list of possible causes can be provided to a user. For example, the causes of an algorithm failure could include "noise level is too high," "actuator beam is severely constrained," "the quality of PRBS probing signals is poor (i.e., variance ratio is low)," or "MD upset is too large." This diagnosis information can be particularly useful for commissioning or trouble shooting a system.

As noted above, probing signal design can occur for both the spatial domain and in the dynamic domain. As a result, in some embodiments, the probing signals used during adaptive alignment can include a set of two-dimensional pseudo random binary sequences (PRBSs).

Figure 4:
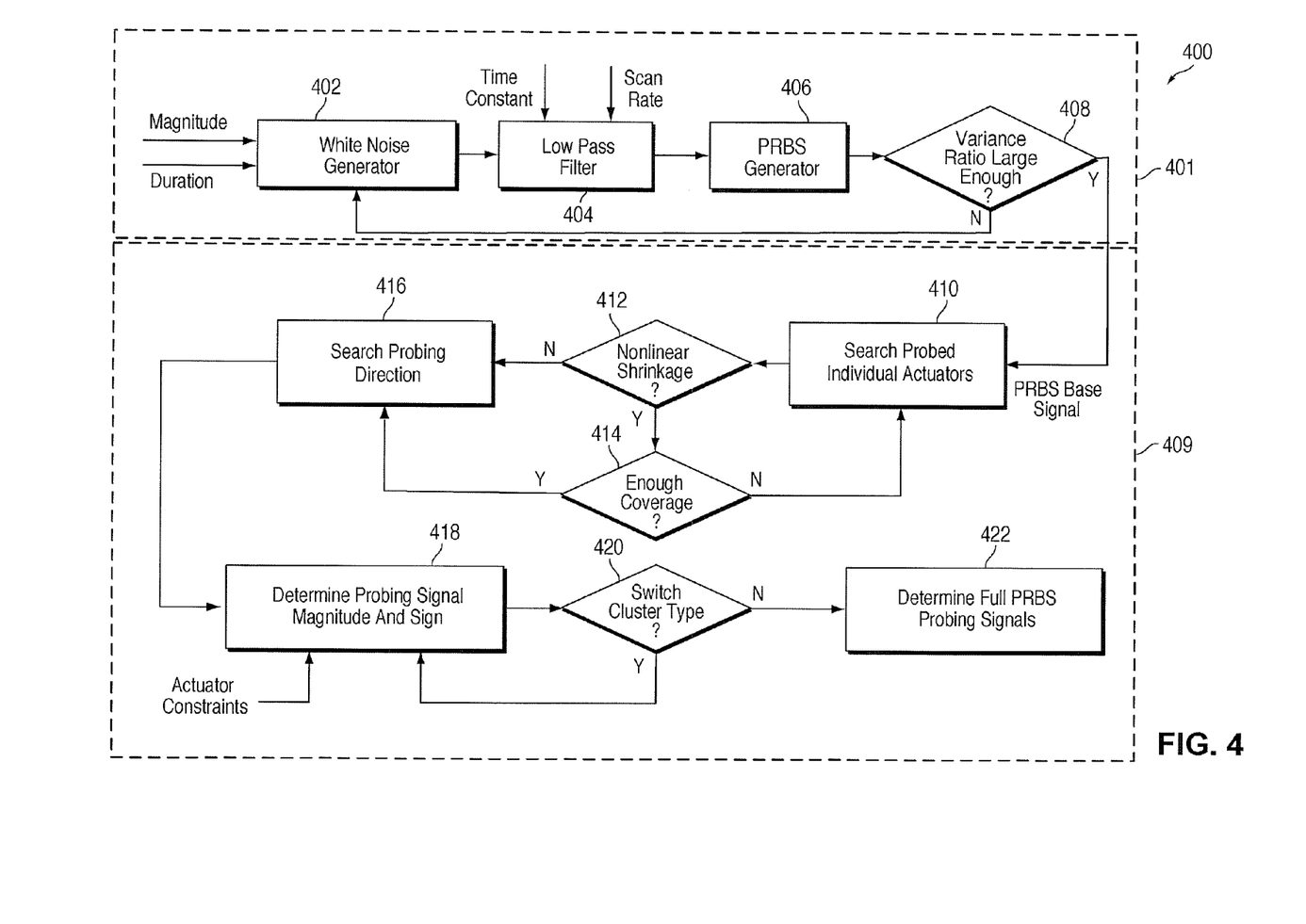

FIG. 4 illustrates an example method 400 for probing signal design in the spatial and dynamic domains. As shown in FIG. 4, probing signal design in the dynamic domain occurs in step 401. Here, a white noise generator generates noise signals at step 402. This can occur using an initial estimate of the magnitude and duration of the probing signals. A low-pass filter filters the output of the white noise generator at step 404. The filter is used in the probing signal design to help identify processes with long time constants and short time delays. The filter can be designed using a time constant and a scan rate associated with the system to be tested. A PRBS generator 406 generates a PRBS base sequence at step 406, such as by selecting an initial pseudo random sequence of values using input from the filter. A determination is made whether a variance ratio is large enough, such as by exceeding a threshold value, at step 408. If not, the steps 402-408 are repeated.

In this example, the base signal used during closed-loop tests is a PRBS in the time domain. The variance ratio is the ratio of auto-covariance of PRBS to the covariance between the PRBS with different delays. The variance ratio is the quality index of PRBS probing signals in FIG. 4. In general, the probing signals with a higher variance ratio and a higher excitation magnitude can lead to better CD alignment identification results. By default, a PRBS can have full band frequency components in the dynamic frequency domain, and its dynamic frequency characteristics can be very similar to Gaussian noise. For processes with relatively long time constants and short time delays, high frequency excitations of the probing signal may not have an excessive effect on the underlying process' performance.

In order to inject higher energy into the process during a closed-loop PRBS test, the low-pass filter is incorporated into the base signal generation. One function of the filter is to generate a binary sequence with relatively longer impulses in the time domain. Generally speaking, the low-pass filter increases the energy that is injected into the system but reduces the value of the variance ratio, which is tightly related to the accuracy of identification results. The overall effect of steps 402-408 is to generate a binary random sequence with relatively longer impulses without deterring statistical properties of the PRBS signals.

This approach can be very useful in practice for processes with relatively long time constants and short time delays, such as those often seen in caliper CD control systems. As a particular example, an induction CD actuator for caliper control can have a time constant as large as 800 seconds and a small time delay as low as ten seconds. For this type of process, the low-pass filter helps in the performance of the alignment identification, since the identification results can improve significantly with use of the filter and iterative PRBS base signal searching.

Probing signal design in the spatial domain occurs in step 409, where a PRBS base signal generated during step 401 is used. A search is performed for candidate actuator zones to be used during testing at step 410. This could include, for example, selecting a subset of actuators in the array 202. A decision is made whether nonlinear shrinkage is accounted for in the system at step 412. This can be done, for example, using a user's selection. If so, a determination is made whether the selected actuators can provide sufficient edge coverage for accurate nonlinear shrinkage identification at step 414. If not, the process returns to step 410 to select another subset of actuators.

If nonlinear shrinkage is not accounted for or if the selected actuators provide adequate coverage for nonlinear shrinkage, the probing direction for the actuators is identified at step 416. Also, each probing signal's magnitude and sign are determined while taking into account actuator constraints at step 418. The probing signals can be deployed in a one-sided, two-sided, or mixed-sided pattern across an actuator beam. Also, the location, magnitude, direction, and duration of the probing signals can be automatically determined without user's intervention.

In the spatial domain, the selected actuators are perturbed in positive and/or negative directions in a random fashion. In some embodiments, actuator setpoints can be switched from positive probing positions to negative probing positions, from positive probing positions to neutral positions, or from negative probing positions to neutral positions depending on the mode of the probing signals.

A determination is made whether a cluster type for the probing signals needs to be changed at step 420. As noted above, the probing signals can be deployed in a one-sided, two-sided, or mixed-sided pattern across an actuator beam. A one-sided pattern indicates that probing signals can inject bumps in one direction (up or down) for all actuators in the subset. A two-sided pattern indicates that probing signals can inject bumps in two directions (up and down) for the actuators in the subset. A mixed pattern is a combination of one-sided and two-sided patterns. One-sided PRBS probing can be automatically implemented for severely constrained actuating systems, and the magnitude of the probing signals can be back-calculated based on the process gain and predicted process noise level. In cases where the required magnitude exceeds an actuator's physical limits, an automatic switch of the cluster type of the PRBS probing signals can be done at step 418.

Once the magnitude and sign of each PRBS signal is determined and no cluster change is needed, the final PRBS signals can be determined at step 422. As can be seen here, actuator physical constraints and selected shrinkage options are incorporated into the probing signal search. Moreover, the probing signals are adaptive to both the spatial and dynamic characteristics of the process being controlled.

Besides the automated generation of the PRBS signals, the probing signals used by the adaptive alignment technique can have other advantages. For instance, the probing signals can have a smaller impact on the CD measurement profiles of the web 108 compared to open-loop persistent "bump" tests. The reasons for this are two-fold. First, the identification tests are performed in closed-loop with feedback correction available to compensate for any process disturbances. Second, the probing signals are a set of positive and/or negative impulses instead of persistent perturbations, which can have a severe effect on web properties.

FIGS. 5 through 8 illustrate more specific example methods for probing signal design. In the following discussion, "cluster type I" refers to a single actuator excitation, "cluster type II" refers to side-by-side two actuator excitations in a group with reduced probing magnitude, and "cluster type III" refers to three actuator excitations formed as a pyramidal group with further magnitude reduction.

Figure 5:
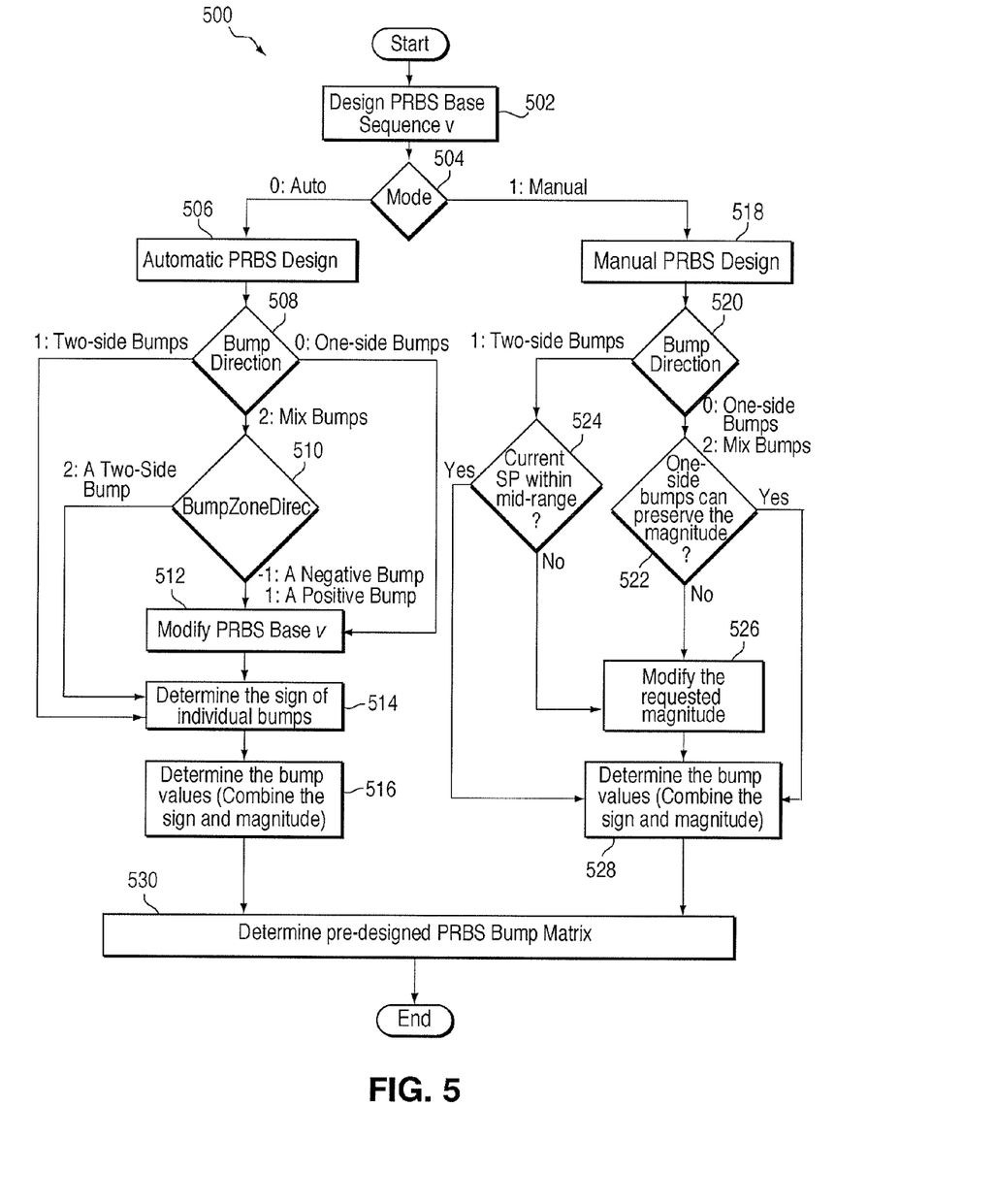

As shown in FIG. 5, a high-level method 500 is provided for PRBS signal design. A PRBS base sequence v is designed at step 502. This could include, for example, performing step 401 described above to create a base sequence. A decision is made whether automatic or manual design mode is desired at step 504. This could include, for example, using user input or previously established settings.

Figure 6A:
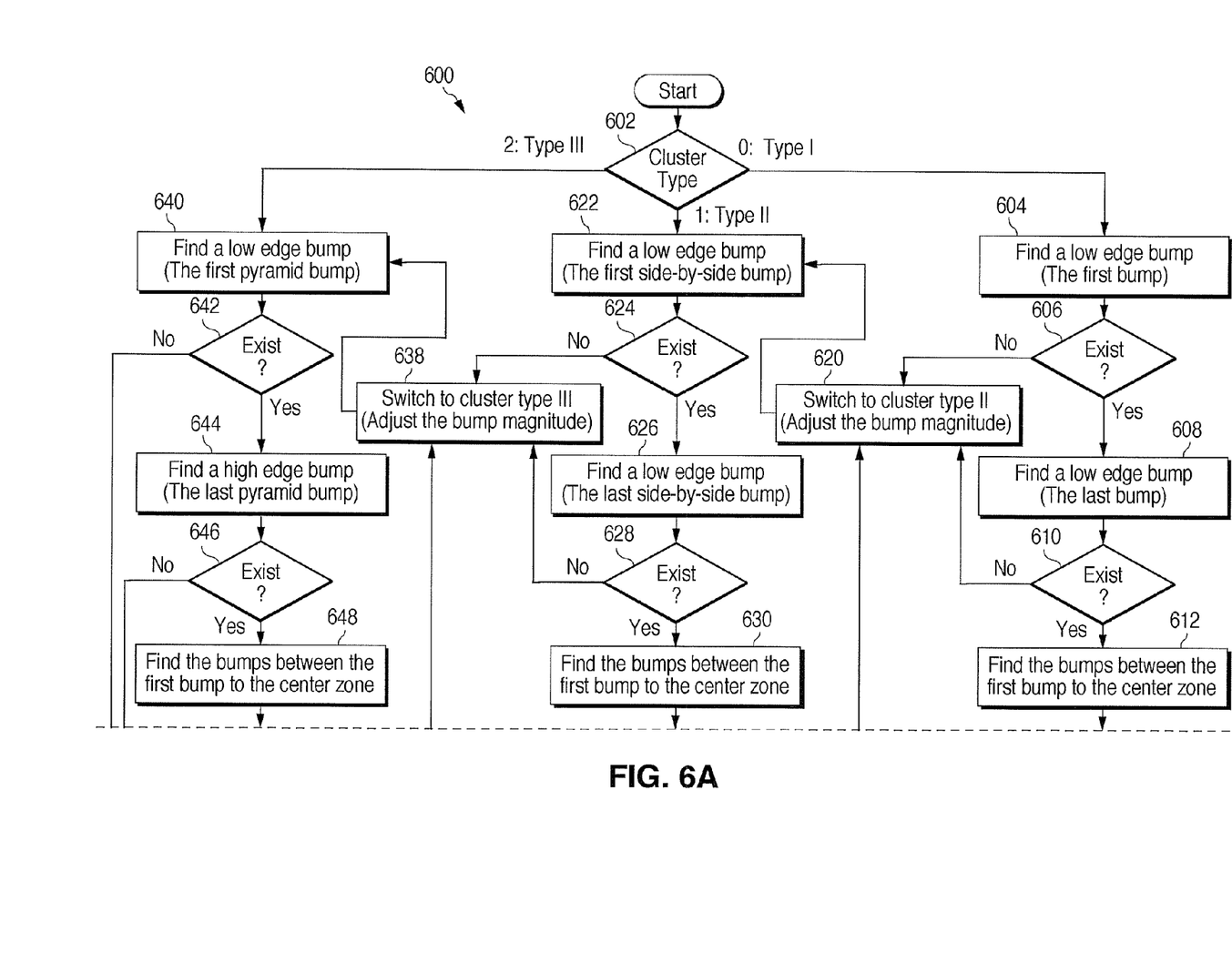
Figure 6B:
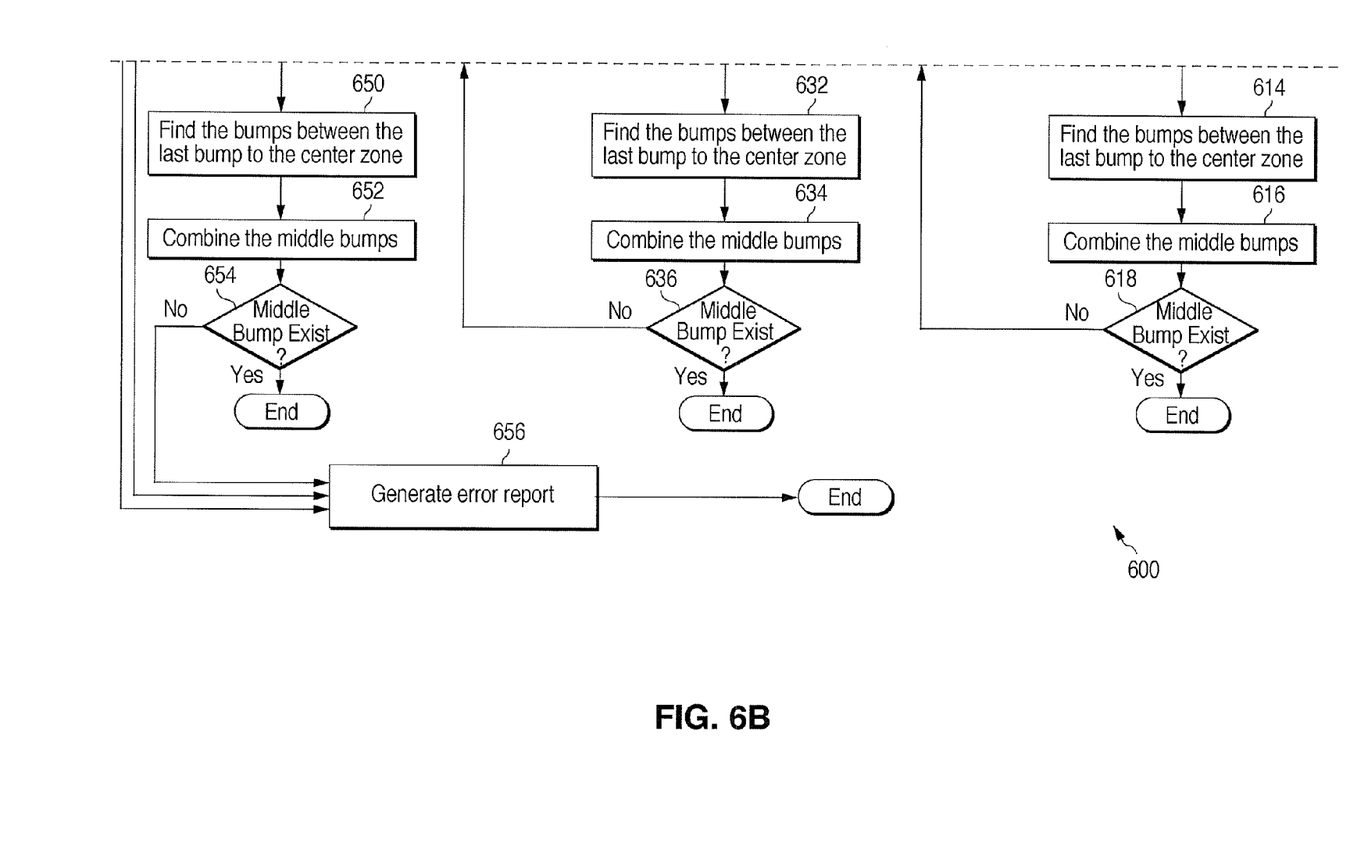

If automatic mode is desired, automatic PRBS design is performed at step 506. An example implementation of this step is shown in FIG. 6, which shows how bumps are created for the PRBS signals. A determination is made whether one-sided, two-sided, or mixed bumps are used in the PRBS signals at step 508. This can be based on any number of factors, such as whether the actuating system is severely constrained. If mixed bumps are used, the direction(s) of the bumps in each zone is(are) determined at step 510. For one-sided bumps (either from step 508 or 510), the PRBS base sequence v is modified so that the bumps are in the proper directions at step 512. For two-sided bumps (either from step 508 or 510) or after the one-sided bumps are determined, the magnitude and sign of each bump is determined at step 514. Also, the bump values are determined by combining each bump's sign and magnitude at step 516. Among other things, this can include attempting the keep the number of positive bumps in the probing signals as close as possible to the number of negative bumps in the probing signals.

If manual mode is desired at step 504, manual PRBS design is executed at step 518. A user could, for example, define the desired magnitudes of the bumps in the probing signals. The user indicates whether one-sided, two-sided, or mixed bumps are to be used in the PRBS signals at step 520. If one-sided or mixed bumps are used, a determination is made whether one-sided bumps can preserve the magnitude of the needed perturbations at step 522. This can include, for example, determining whether a user-specified probing signal can be accommodated based on current actuator setpoint profiles and physical constraints. If not, the requested magnitude of the PRBS signal is modified at step 526. After step 524 or if the one-sided bumps can preserve the desired magnitude, the bump values are determined by combining each bump's sign and magnitude at step 528. If two-sided bumps are requested at step 520, a determination is made whether the current actuators' setpoints are within the mid-range of the actuators' potential values at step 524. If not, the requested magnitude of the PRBS signal is modified at step 526, and the bump values are determined at step 528.

Whether automatic or manual design is selected, a pre-designed PRBS bump matrix is determined at step 530. This could include, for example, defining a matrix for the actuators to be tested during alignment identification. Each entry in the matrix could identify the bump value to be used for the associated actuator in the array 202.

In FIG. 6, a method 600 for automatic PRBS design in shown. The method 600 could be used, for example, during step 506 of FIG. 5. As shown in FIG. 6, the current cluster type for the PRBS signals being designed is identified at step 602. If the current cluster type is "type I," an attempt is made to find the first bump in the proposed signals at step 604. Assuming it exists at step 606, an attempt is made to find the last bump in the proposed signals at step 608. Assuming it exists at step 610, bumps between the first bump and a central position of the signals are identified at step 612, and bumps between the last bump and the central position are identified at step 614. An attempt is made to combine the middle bumps at step 616, and if successful at step 618 the process ends. At this point, the process can output a collection of bumps for a "type I" single actuator excitation.

If any of the attempts fail at steps 606, 610, and 618, the cluster type is switched to "type II" and bump magnitudes are reduced at step 620. At that point or if the cluster type is "type II" at step 602, an attempt is made to find the first side-by-side bumps at step 622. Assuming they exist at step 624, an attempt is made to find the last side-by-side bumps at step 626. Assuming they exist at step 628, bumps between the first bumps and the central position are identified at step 630, and bumps between the last bumps and the central position are identified at step 632. An attempt is made to combine the middle bumps at step 634, and if successful at step 636 the process ends. At this point, the process can output a collection of bumps for a "type II" side-by-side two actuator excitation.

If any of the attempts fail at steps 624, 628, and 636, the cluster type is switched to "type III" and bump magnitudes are further reduced at step 638. At that point or if the cluster type is "type III" at step 602, an attempt is made to find the low-edge bump for a pyramidal group at step 640. Assuming it exists at step 642, an attempt is made to find the high-edge bump for the pyramidal group at step 644. Assuming it exists at step 646, bumps between the first bump and the central position are identified at step 648, and bumps between the last bump and the central position are identified at step 650. An attempt is made to combine the middle bumps at step 652, and if successful at step 654 the process ends. At this point, the process can output a collection of bumps for a "type III" pyramidal three actuator excitation. Otherwise, an error report is generated and output at step 656, as a group of bumps could not be determined.

Figure 7:
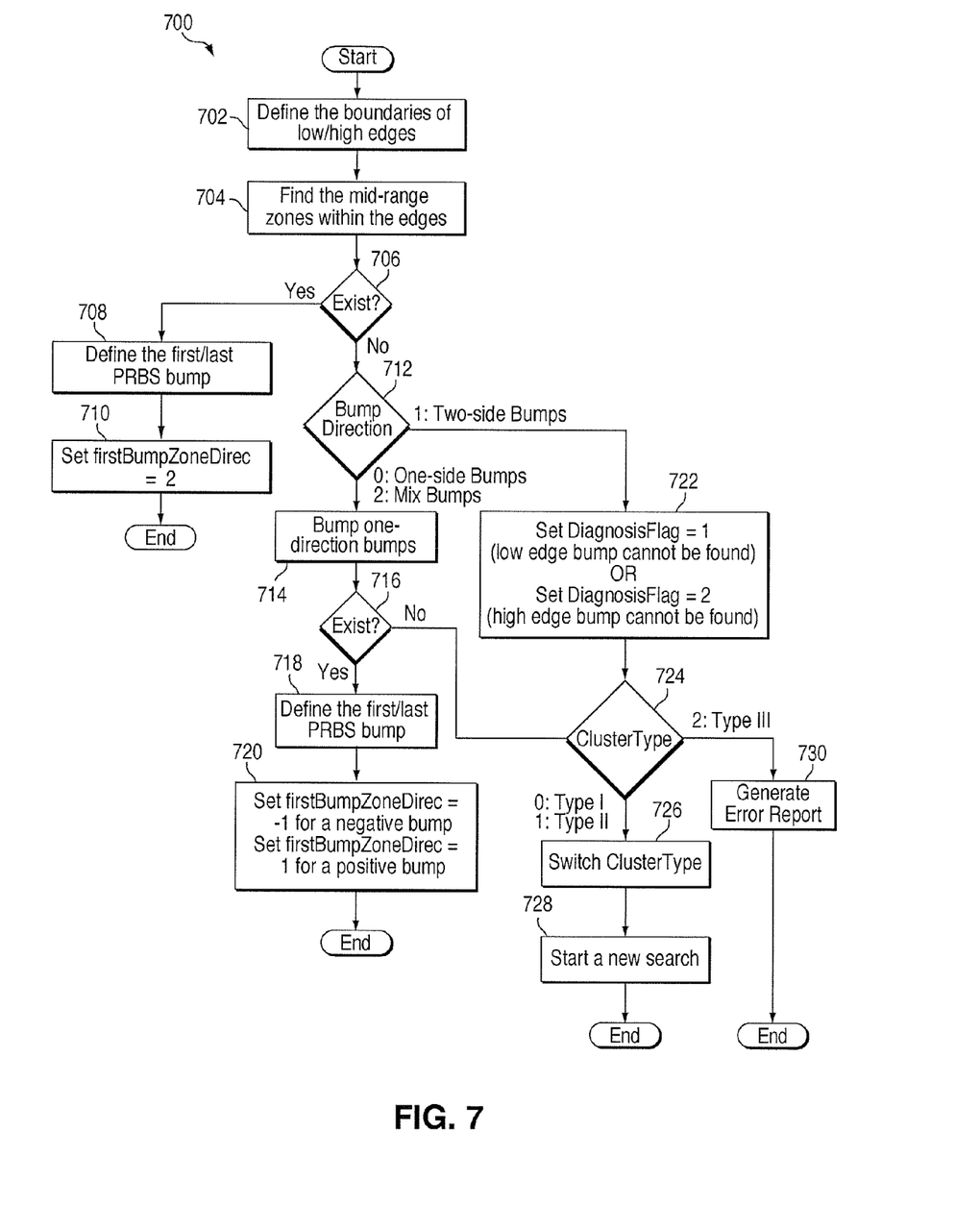

FIG. 7 illustrates an example method 700 for finding a low-edge or high-edge bump, which is done in FIG. 6 repeatedly. As shown in FIG. 7, an attempt is made to define the boundaries of the low and high edges at step 702, and an attempt is made to locate the mid-range zone between the low and high edges at step 704. This could include, for example, identifying locations near which the first and last bumps should be located and identifying a mid-range zone between those locations. If those locations can be identified and exist at step 706, the first or last bump is identified at step 708, and the bump direction for that zone is set to a two-sided bump at step 710.

Otherwise, the bump direction is identified at step 712. For one-sided or mixed bumps, an attempt is made to bump any one-direction bumps (increase those bumps in magnitude) at step 714. If successful at step 716, the first or last bump is defined at step 718, and the zone direction is set to either positive or negative at step 720.

If the bump direction identified at step 712 is two-sided, a diagnosis flag is set at step 722 indicating that a low-edge or high-edge bump cannot be located. After step 722 or in response to a failure at step 716, the current cluster type is identified at step 724. If the current cluster type is "type I" or "type II," the cluster type is switched at step 726, and a repeated search is initiated at step 728. Otherwise, if the current cluster type is "type III," an error report is generated at step 730, and the process ends.

Figure 8:
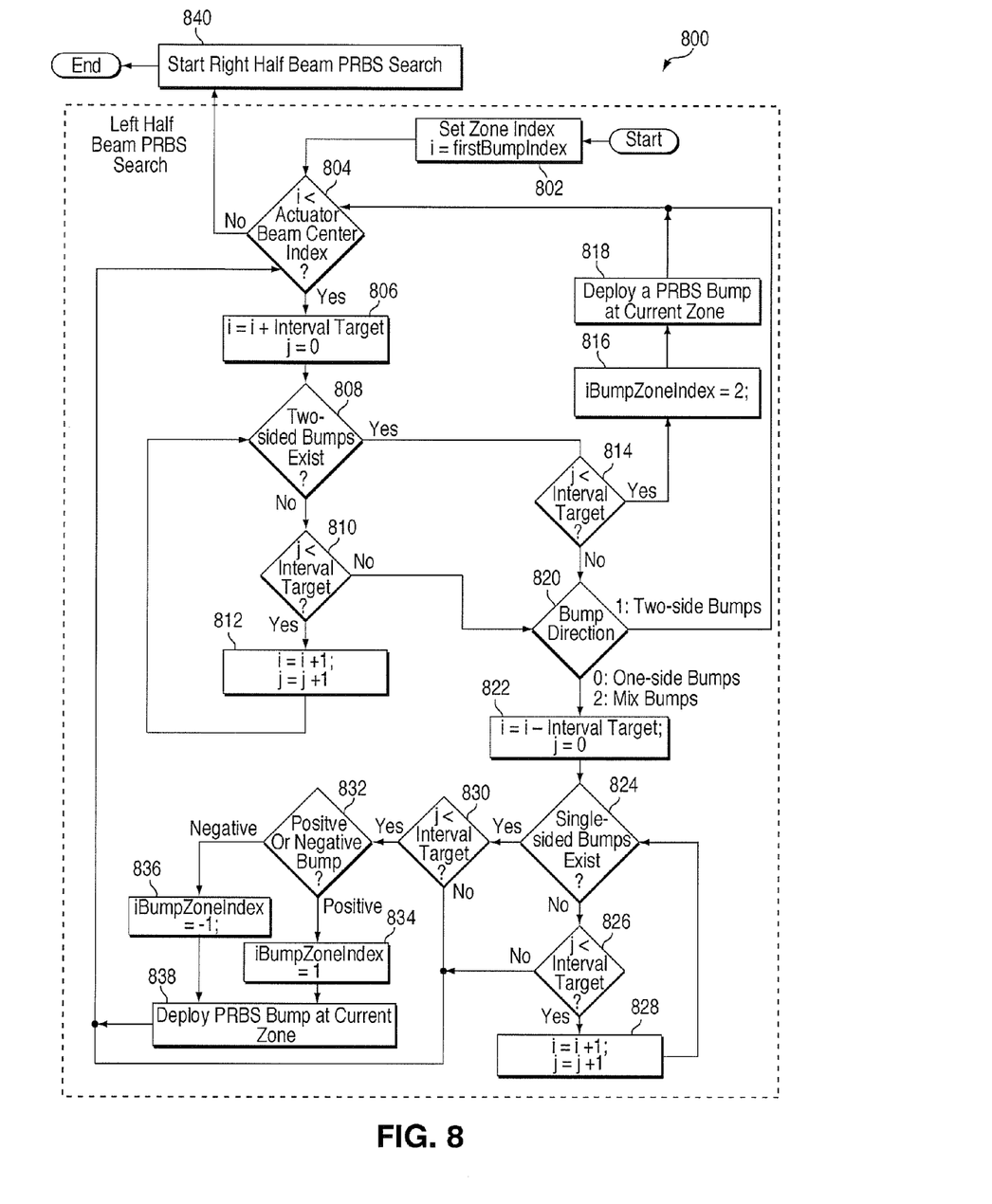

FIG. 8 illustrates an example method 800 for finding a middle bump, which is also done in FIG. 6 repeatedly. As shown in FIG. 8, a zone index i is set to a first bump's index value at step 802, and a determination is made whether the value of i is within the left-half of an actuator beam at step 804. If so, the zone index i is incremented with an interval target value and a value j is initialized to zero at step 806. A determination is made whether two-sided bumps exist in the zone index i at step 808. If not, the value j is compared to the interval target value at step 810. If the value j is less than the interval target value, the zone index i and the value j are incremented at step 812, and the process returns to step 808.

If two-sided bumps do exist at step 808, the value j is compared to the interval target value at step 814. If it is less, a bump zone index value for the current zone defined by i is set to two (indicating a two-sided bump) at step 816, and a two-sided PRBS bump is deployed at the current zone at step 818.

If the value j exceeds the interval target at step 810 or 814, the bump direction is identified at step 820. If two-sided bumps are used, the process returns to step 804. Otherwise, if one-sided or mixed bumps are used, the value i is set to its current value minus the interval target and the value j is set to zero at step 822. A determination is made whether a single-sided bump exists at the current zone defined by i at step 824. If not, the value j is compared to the interval target value at step 826. If j is less, the values of i and j are incremented, and the process returns to step 824. If j is more, the process returns to step 804.

If a single-sided bump exists at the current zone defined by i, the value j is compared to the interval target value at step 830. If it is less, a determination is made whether the single-sided bump is positive or negative at step 832. The bump zone index value for the current zone is set to one for a positive one-sided bump at step 834 or negative one for a negative one-sided bump at step 836. In either case, a one-sided PRBS bump is deployed at the current zone at step 838.

This process can be repeated for all actuator zones in the left half of the actuator beam. At some point, the zone index i reaches the center index, and step 804 redirects the process to a right-half beam PRBS search at step 840. The right-half search can be similar to the process performed in steps 802-838.

Among other things, the methods shown in FIGS. 5 through 8 support various features including:
- the grouping of CD actuator zones in different cluster patterns (single, side-by-side, pyramidal) during alignment identification;
- if the user specifies the cluster type and current actuator setpoint profiles and/or actuator physical constraint setups cannot accommodate that type's probing signals, the adjustment of the cluster type along with a corresponding adjustment to the magnitudes of the probing signals;
- the deployment of a probing signal as a one-sided perturbation, a two-sided perturbation, or a mix of one-sided and two-sided perturbations across a CD actuator beam;
- the attempt to keep the number of positive probing signals as close as possible to the number of negative probing signals at each scan of the identification experiment, which can reduce or minimize the machine direction upsets caused by the identification process;
- the use of an adaptive filter in the probing signal design to handle processes with extensive long time constants and relatively short time delays; and
- the design of probing signals in both spatial domain and dynamic domain. In the spatial domain, probing signals can be specified with different probing modes (probing directions), cluster types, and linear or nonlinear shrinkage profile's edge coverages. In the dynamic domain, PRBS base functions can be specified with different low-pass filters and different variance ratios. An iterative search approach can be used to derive the probing signals with the best tradeoff between the quality of PRBS excitation and the energy injected to the process.

Although FIGS. 3 through 8 illustrate examples of methods for closed-loop alignment identification with adaptive probing signal design, various changes may be made to FIGS. 3 through 8. For example, while shown as a series of steps, various steps in each figure could overlap, occur in parallel, occur in a different order, or occur multiple times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
designing probing signals for testing an alignment of actuators in a web manufacturing or processing system with measurements of a web of material being manufactured or processed by the system; and providing the probing signals during alignment testing to identify the alignment of the actuators with the measurements of the web;

wherein designing the probing signals comprises designing the probing signals in both a spatial domain and a dynamic domain associated with the web manufacturing or processing system; and wherein designing the probing signals in the dynamic domain comprises generating noise signals based on an initial estimate of one or more magnitudes and one or more durations of the probing signals, filtering the noise signals based on a scan rate of the system, and generating base probing signals based on the filtered noise signals.

2. The method of claim 1, wherein:
the spatial domain is directed across a width of the web; and
the dynamic domain is directed along a length of the web.

3. The method of claim 1, wherein designing the probing signals comprises determining how to deploy perturbations in the probing signals, the perturbations being deployed as any of one-sided bumps, two-sided bumps, or a combination of one-sided and two-sided bumps.

4. The method of claim 1, wherein:
designing the probing signals comprises determining how to deploy perturbations in the probing signals, the perturbations comprising positive bumps and negative bumps; and
the probing signals are designed so that a number of positive bumps at least approximately equals a number of negative bumps.

5. The method of claim 1, wherein designing the probing signals comprises:
attempting to locate at least one of a low-edge bump, a high-edge bump, and a middle bump in a base probing signal among the generated base probing signals; and
if at least one of the bumps cannot be located, adjusting a bump magnitude in the base probing signal.

6. The method of claim 1, wherein designing the probing signals comprises:
identifying a user-specified cluster type associated with the probing signals;
determining if a current actuator setpoint profile or an actuator physical constraint setup cannot accommodate the user-specified cluster type's probing signals; and
based on the determination, adjusting the cluster type and the one or more magnitudes of the probing signals.

7. The method of claim 1, wherein designing the probing signals comprises identifying locations, magnitudes, directions, and durations of perturbations in the probing signals automatically without user input.

8. The method of claim 1, wherein the base probing signals comprise Pseudo-Random Binary Sequence (PRBS) signals.

9. An apparatus comprising:
at least one processor configured to design probing signals for testing an alignment of actuators in a web manufacturing or processing system with measurements of a web of material being manufactured or processed by the system; and
at least one interface configured to provide the probing signals during alignment testing to identify the alignment of the actuators with the measurements of the web;

wherein the at least one processor is configured to design the probing signals in both a spatial domain and a dynamic domain associated with the web manufacturing or processing system; and wherein the at least one processor is configured to design the probing signals in the dynamic domain by generating noise signals based on an initial estimate of one or more magnitudes and one or more durations of the probing signals, filtering the noise signals based on a scan rate of the system, and generating base probing signals based on the filtered noise signals.

10. The apparatus of claim 9, wherein the at least one processor is configured to design the probing signals by determining how to deploy perturbations in the probing signals, the perturbations being deployed as any of one-sided bumps, two-sided bumps, or a combination of one-sided and two-sided bumps.

11. The apparatus of claim 9, wherein the at least one processor is configured to design the probing signals by identifying locations, magnitudes, directions, and durations of perturbations in the probing signals automatically without user input.

12. The apparatus of claim 9, wherein the at least one processor is configured to design the probing signals by:
attempting to locate at least one of a low-edge bump, a high-edge bump, and a middle bump in a base probing signal among the generated base probing signals; and
if at least one of the bumps cannot be located, adjusting a bump magnitude in the base probing signal.

13. The apparatus of claim 12, wherein the at least one processor is configured to select subsets of actuators based on a shrinkage profile associated with the web manufacturing or processing system.

14. The apparatus of claim 9, wherein the base probing signals comprise Pseudo-Random Binary Sequence (PRBS) signals.

15. A system comprising:
at least one processor configured to design probing signals for testing an alignment of actuators in a web manufacturing or processing system with measurements of a web of material being manufactured or processed by the web manufacturing or processing system; and
a signal generator configured to provide the probing signals during alignment testing to identify the alignment of the actuators with the measurements of the web;

wherein the at least one processor is configured to design the probing signals in both a spatial domain and a dynamic domain associated with the web manufacturing or processing system; and wherein the at least one processor is configured to design the probing signals in the dynamic domain by generating noise signals based on an initial estimate of one or more magnitudes and one or more durations of the probing signals, filtering the noise signals based on a scan rate of the system, and generating base probing signals based on the filtered noise signals.

16. The system of claim 15, wherein:
the at least one processor is configured to design the probing signals by determining how to deploy perturbations in the probing signals; and
the signal generator is configured to deploy the perturbations as any of one-sided bumps, two-sided bumps, or a combination of one-sided and two-sided bumps.

17. The system of claim 15, wherein the at least one processor is configured to design the probing signals by:

attempting to locate at least one of a low-edge bump, a high-edge bump, and a middle bump in a base probing signal among the generated base probing signals; and if at least one of the bumps cannot be located, adjusting a bump magnitude in the base probing signal.

18. The system of claim 15, wherein the base probing signals comprise Pseudo-Random Binary Sequence (PRBS) signals.

19. The system of claim 15, wherein:

the spatial domain is directed across a width of the web; and the dynamic domain is directed along a length of the web.

20. The method of claim 1, wherein designing the probing signals in the dynamic domain further comprises determining whether a variance ratio of the base probing signals satisfies a threshold value, the variance ratio being a ratio of auto-covariance of the base probing signals to a covariance between the base probing signals with different delays.

* * * * *